United States Patent [19]

Golden et al.

[11] 4,076,584

[45] Feb. 28, 1978

[54] RODDED SHUTDOWN SYSTEM FOR A NUCLEAR REACTOR

[75] Inventors: Martin P. Golden, Penn Township, Allegheny County; Aldo R. Govi, Greensburg, both of Pa.

[73] Assignee: The United States of America as represented by the United States Department of Energy, Washington, D.C.

[21] Appl. No.: 653,175

[22] Filed: Jan. 28, 1976

[51] Int. Cl.² .............................................. G21C 7/08
[52] U.S. Cl. ................................................ 176/36 R
[58] Field of Search .......................... 176/36 R, 19 EC; 91/196; 92/35

[56] References Cited

U.S. PATENT DOCUMENTS

| | | | |
|---|---|---|---|
| 2,521,557 | 9/1950 | Wyckoff | 91/196 |
| 3,099,136 | 7/1963 | Carlson, Jr. | 92/35 |
| 3,432,387 | 3/1969 | Jonsson | 176/36 R |
| 3,462,345 | 8/1969 | Jabsen | 176/36 R |
| 3,607,629 | 9/1971 | Frisch | 176/36 R |
| 3,632,471 | 1/1972 | Traube et al. | 176/36 R |
| 3,733,251 | 5/1973 | Gilbertson et al. | 176/36 R |
| 3,906,469 | 9/1975 | Kronk | 176/19 R |

*Primary Examiner*—Samuel Feinberg

[57] ABSTRACT

A top mounted nuclear reactor diverse rodded shutdown system utilizing gas fed into a pressure bearing bellows region sealed at the upper extremity to an armature. The armature is attached to a neutron absorber assembly by a series of shafts and connecting means. The armature is held in an uppermost position by an electromagnet assembly or by pressurized gas in a second embodiment. Deenergizing the electromagnet assembly, or venting the pressurized gas, causes the armature to fall by the force of gravity, thereby lowering the attached absorber assembly into the reactor core.

2 Claims, 16 Drawing Figures

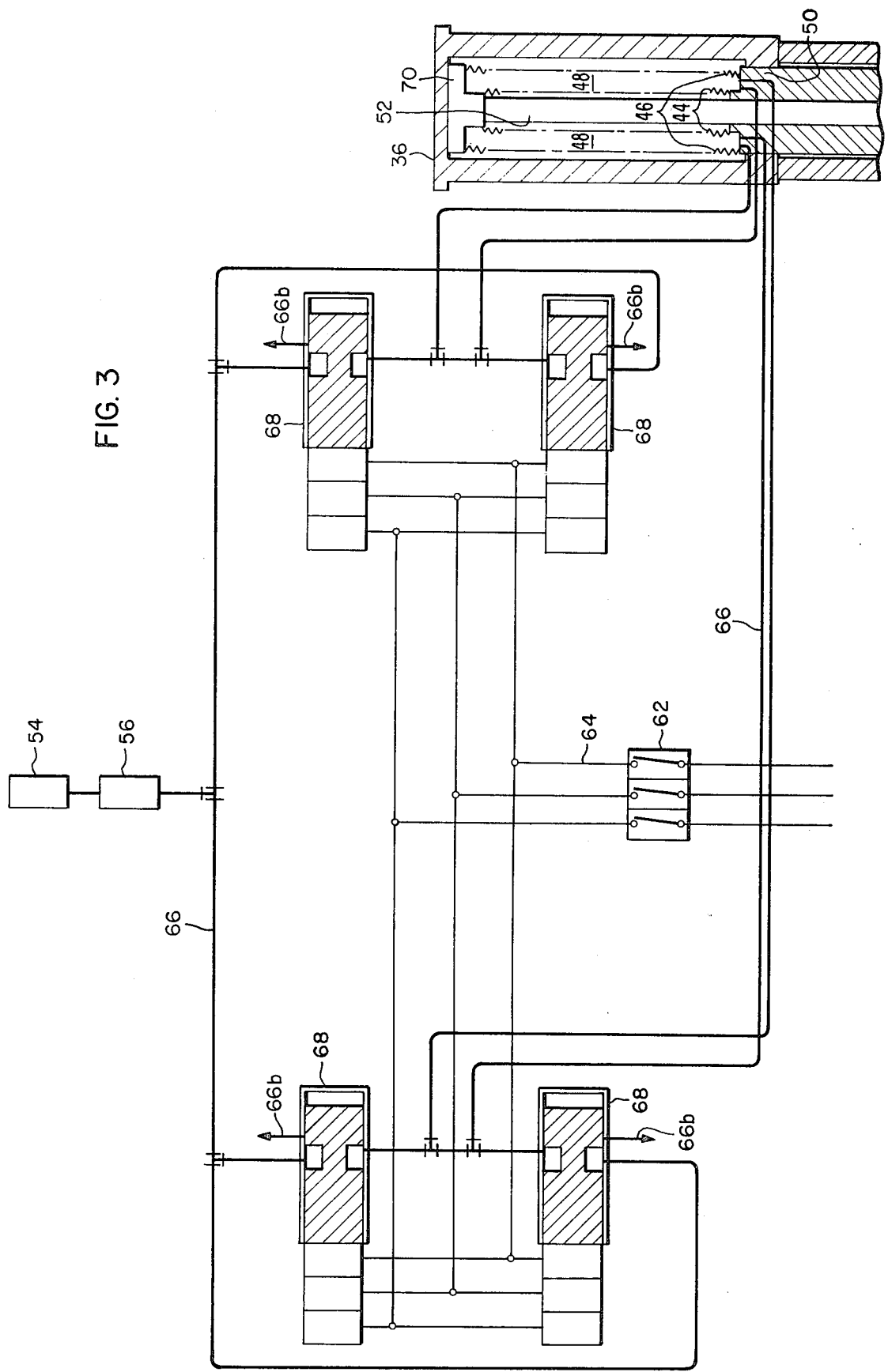

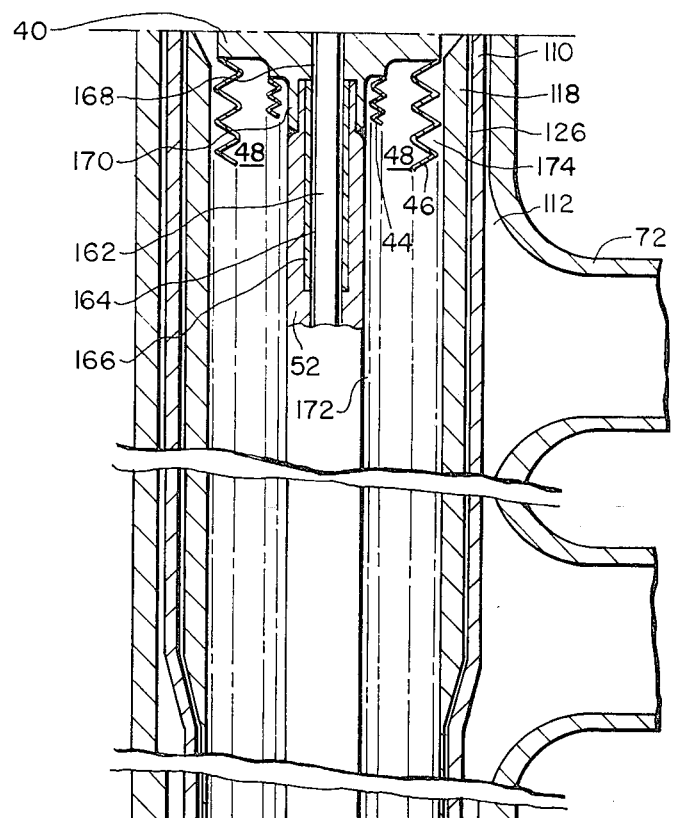
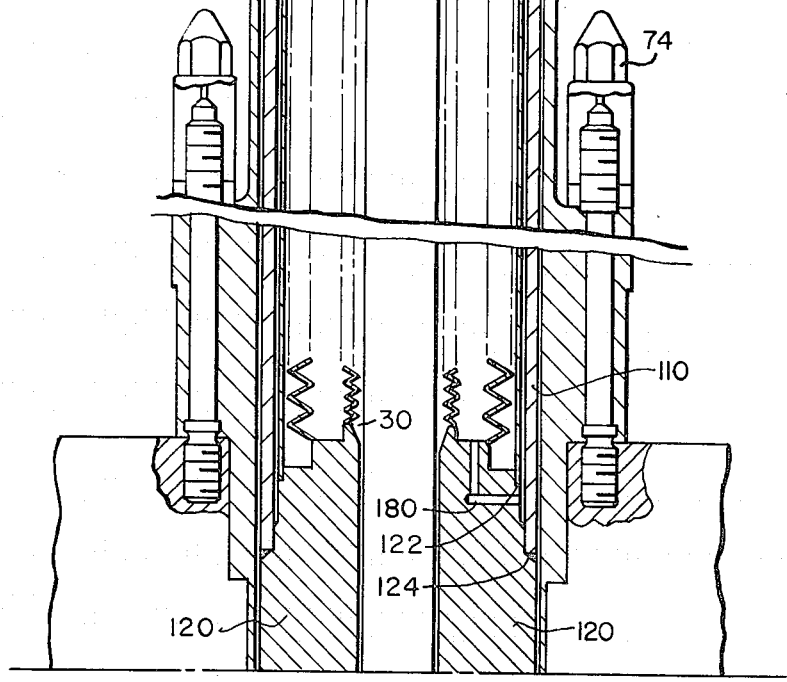
FIG. 4B

RODDED SHUTDOWN SYSTEM FOR A NUCLEAR REACTOR

The invention described herein was made in the course of, or under, a contract with the Energy Research And Development Administration (ERDA), successor in interest to the U.S. Atomic Energy Commission (AEC).

BACKGROUND OF THE INVENTION

1. Field of the Invention

This invention relates to nuclear reactors, and specifically to a rodded system for rapid shutdown of the reactor.

2. Description of the Prior Art

A main requirement for most nuclear power facilities is that diverse means for shutting down the reactor exist. Of major import is that diversity exists between the base control system and the emergency shutdown system. A prime concern that the diversity alleviates is common mode failures, as opposed to random independent failures against which redundancy is the means of protection. The major sources of common mode failures are (1) external environment (floods, fires), (2) design or manufacturing deficiencies (improper manufacture of the same part of a system), (3) operating and maintenance errors (incorrect calibration or instruction), and (4) functional deficiencies (unrecognized deficiencies, unanticipated operation changes). Diversity as a main defense against common mode failures may be categorized as (1) functional diversity (instrumentation response to different parameters), (2) equipment diversity (different instruments and mechanisms), (3) location diversity (physical separation), and (4) interfacing diversity (components not affected by failures in interfacing systems). This invention was prompted by the desire to have a diverse shutdown system for the Fast Flux Test Facility (FFTF), a facility which is a major testing ground for sodium cooled fast breeder reactor technology.

This invention will therefore be primarily applicable to liquid metal cooled nuclear reactors, although it can be applied to other reactor types. Most present day water cooled reactors utilize an injection of liquid boric acid solution for emergency shutdown. The properties of boron are such that it has a high cross section for thermal and also fast neutrons, and has no adverse affect on the nuclear system in proper solution. However, it cannot easily be utilized in a sodium cooled reactor due to the resulting exothermic reaction with sodium, and also because of the purification of the liquid sodium coolant that would be required subsequent to testing or emergency actuation of, a boron injecting system. A system which will rapidly admit boron or other high cross section substances to the core region in an encased fashion is therefore typically used. Most typical are control rod drive mechanisms (CRDM), which provide a means to lower an assembly of rods containing a form of boron, or other neutron absorbing materials, into a reactor core. Many existing devices are based upon holding a control rod assembly in an upper position through use of an electromagnet and redundant latch mechanisms. These devices are typically raised to their uppermost position by mechanical latching means. Typical prior art apparatus also include top mounted rack and pinion and drum and cable devices, as well as bottom or top mounted hydraulic piston devices. Some devices assist the downward drop with springs or pistons, since a rapid drop into the core region is required. Some types utilize hydraulic means to assist the downward motion and may also use hydraulic means to raise the control rod assembly from the core. Most prior art shutdown systems also include damping means to break the downward motion and prevent significant damage to the fuel assembly, as does this invention. This invention also incorporates a control rod assembly held in an upper position by electromagnetic means, in one embodiment, and a gravity forced fall. In another embodiment, pneumatic means hold the control rod assembly in the uppermost position. In both instances, pneumatic means are utilized to raise the assembly from the core. Adequate diversity is provided on the FFTF reactor because the shutdown system responds to a variety of plant signals, is of a totally distinct design compared to existing rod drive mechanisms, and will not be affected by assumed failures in the base control system control rod drive mechanisms. The base control system of the FFTF utilizes a control rod drive mechanism of the roller nut type. In that design a stator an drive motor assembly drives the threaded roller nuts which engage a lead screw ultimately connected to the boron type absorber assembly. The roller nuts are disengaged to shutdown the reactor. This diversity is applicable to other reactors as well. Redundancy is provided in the invention disclosed and described herein by means associated with the pneumatic source. This system also provides, as do most prior art devices, a fail-safe design in the sense that loss of either a pneumatic or electromagnetic holding source directly causes the absorber assembly to drop, by gravity, into the reactor core.

SUMMARY OF THE INVENTION

The invention disclosed and described herein provides a diverse means to shutdown a nuclear reactor or a nuclear core testing apparatus. Diversity is provided primarily by the novelty of a pneumatic apparatus. Additionally, the system provides adequate redundancy in the pneumatic source as required for nuclear applications.

In accordance with this invention, a plurality of two position solenoid valves, downstream of a pressurized gas source and a gas flow limiter, feed gas into an expandable bellows region within a reactor vessel head mounted control rod drive apparatus. The pressurized gas may be vented out of the apparatus through the flow lines by which it enters, or by a separate vent system. Feeding pressurized gas into the expandable bellows region raises an attached armature which forms the upper surface of the bellows region. The armature is held in place by the flux generated by an electromagnet in one main embodiment, and by the pressurized gas in a second embodiment. The armature is removably connected to a neutron absorbing assembly by a series of shafts, which shafts are provided with a relatively large clearance to surrounding components so as to minimize the possibility of any binding when the absorber assembly and affixed components drop. On an emergency or test signal, the electromagnet is deenergized in the first embodiment, and the pressurized gas is vented in the second. One of the shafts contain a series of reed switches, actuated by a permanent magnet, to provide position indication.

The control rod drive apparatus includes internally contained shields. The shields limit emission of neutrons and other radioactive releases out of the reactor at the apparatus location. Also included in the apparatus is a buffer piston which utilizes frictional forces of the reactor coolant to decelerate the fall of the absorber assembly and affixed components. An assembly of orifice plates in the lower portion of the apparatus controls the amount of coolant fluid entering the apparatus, as the absorber assemblies do not require the high coolant flow of other core assemblies. The structural guide tubing surrounding the lower connecting shafts and the absorber assembly contain outlet holes through which the coolant fluid exits the apparatus and enters the upper region above the reactor core.

For maintenance purposes, or absorber replacement, the entire interior portions of the control rod drive apparatus are removable from the top of the outer pressure tube, which tube may be bolted onto a test apparatus such as in the Fast Flux Test Facility (FFTF), or welded to the closure head of a nuclear reactor pressure vessel. These removable internal portions are suspended from a shoulder of the outer pressure tube at an elevation above the closure head. Sealing means are provided to insure that reactor cover gas which communicates with the upper portions of the apparatus are not released to the environment surrounding the reactor vessel.

BRIEF DESCRIPTION OF THE DRAWINGS

The functions and advantages of this invention will become more apparent from reading the following description in connection with the accompanying drawings, in which:

FIG. 3 is a simplified schematic, in cross-section, of a second embodiment showing additional detail of the pneumatic piping and electrical circuitry;

FIGS. 4A, 4B, 4C, 4D, 4E, 4F and 4G is a view, in cross-section, from top to bottom, of the main apparatus in one embodiment system disclosed;

DESCRIPTION OF THE PREFERRED EMBODIMENTS

The disclosed invention is described by reference to the Figures.

Figure 1:
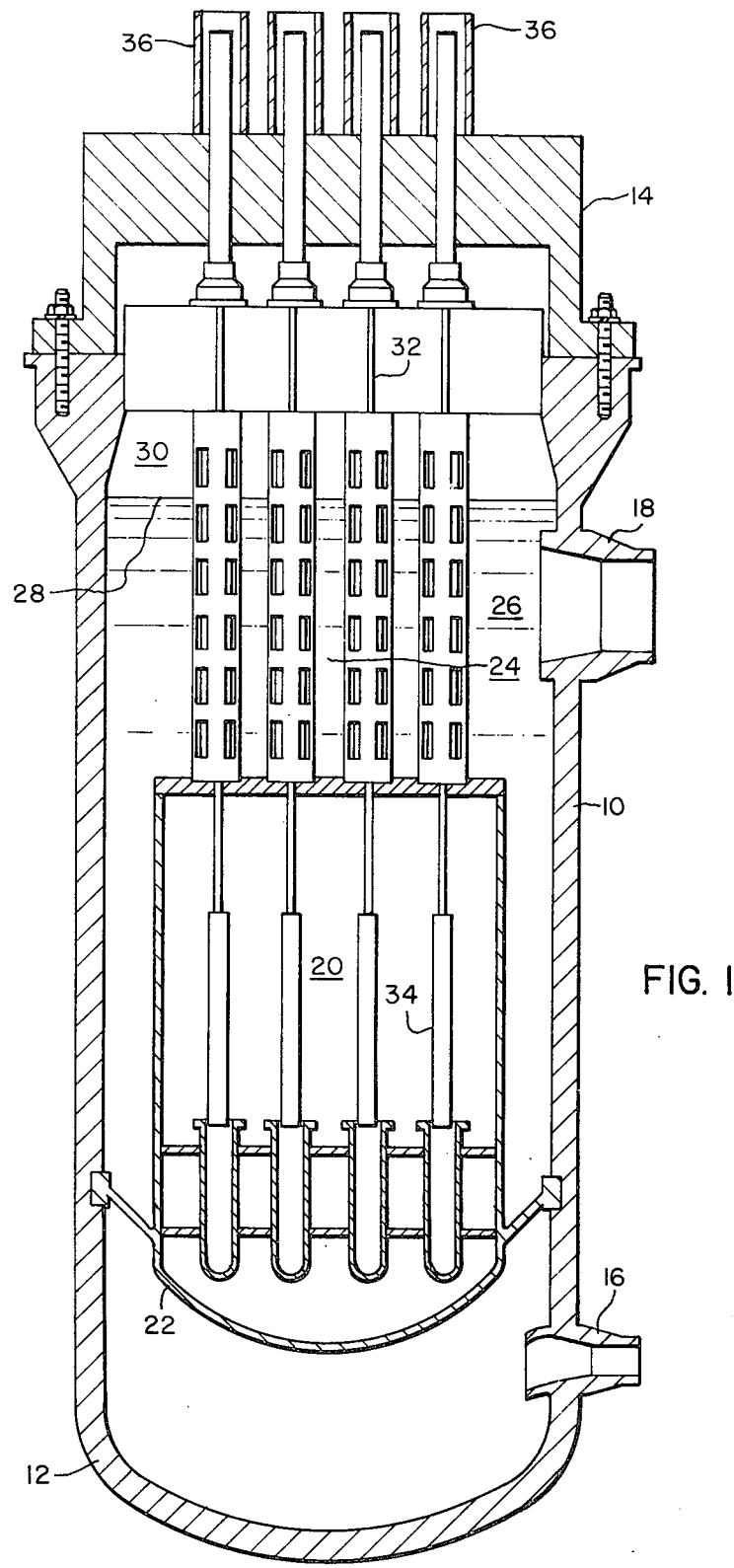
FIG. 1 is a simplified schematic, in cross-section, of a typical nuclear reactor pressure vessel and internal components.

FIG. 1 is a simplified partial schematic of a typical nuclear reactor to which this invention is applicable. The Figure shows a generally cylindrical pressure vessel 10 bounded by a bottom bell 12 and a closure head 14. The pressure vessel 10 wall incorporates a plurality of inlet nozzles 16 and outlet nozzles 18 through which the reactor coolant fluid flows into and out of the pressure vessel 10. The coolant fluid enters the core 20 area from the bottom through the core support structure 22 which is permanently welded to the pressure vessel 10. Shown above the core 20 area are a portion of the upper internals 24, supported from the closure head 14, which function to provide a backup mechanical holddown for the core 20, to position, protect, guide and support core instrumentation, to assure alignment of the control rod systems, and to control flow in the pressure vessel outlet plenum 26. The level of coolant fluid 28 during normal operation is shown by the wavy line. Above the liquid coolant is typically an inert cover gas 30, such as argon. Penetrating the closure head 14 and continuing to the core 20 are portions of the control rod drive mechanisms (CRDM) 32 and neutron absorber assemblies 34, discussed in detail below. Permanently fixed to the upper surface of the closure head 14, and enclosing the control rod drive mechanisms 32 are outer pressure tubes 36. In the FFTF, the outer pressure tubes 36 are referred to as "spoolpieces", and would generally be termed "stand-pipes" in a commercial reactor.

Figure 2:
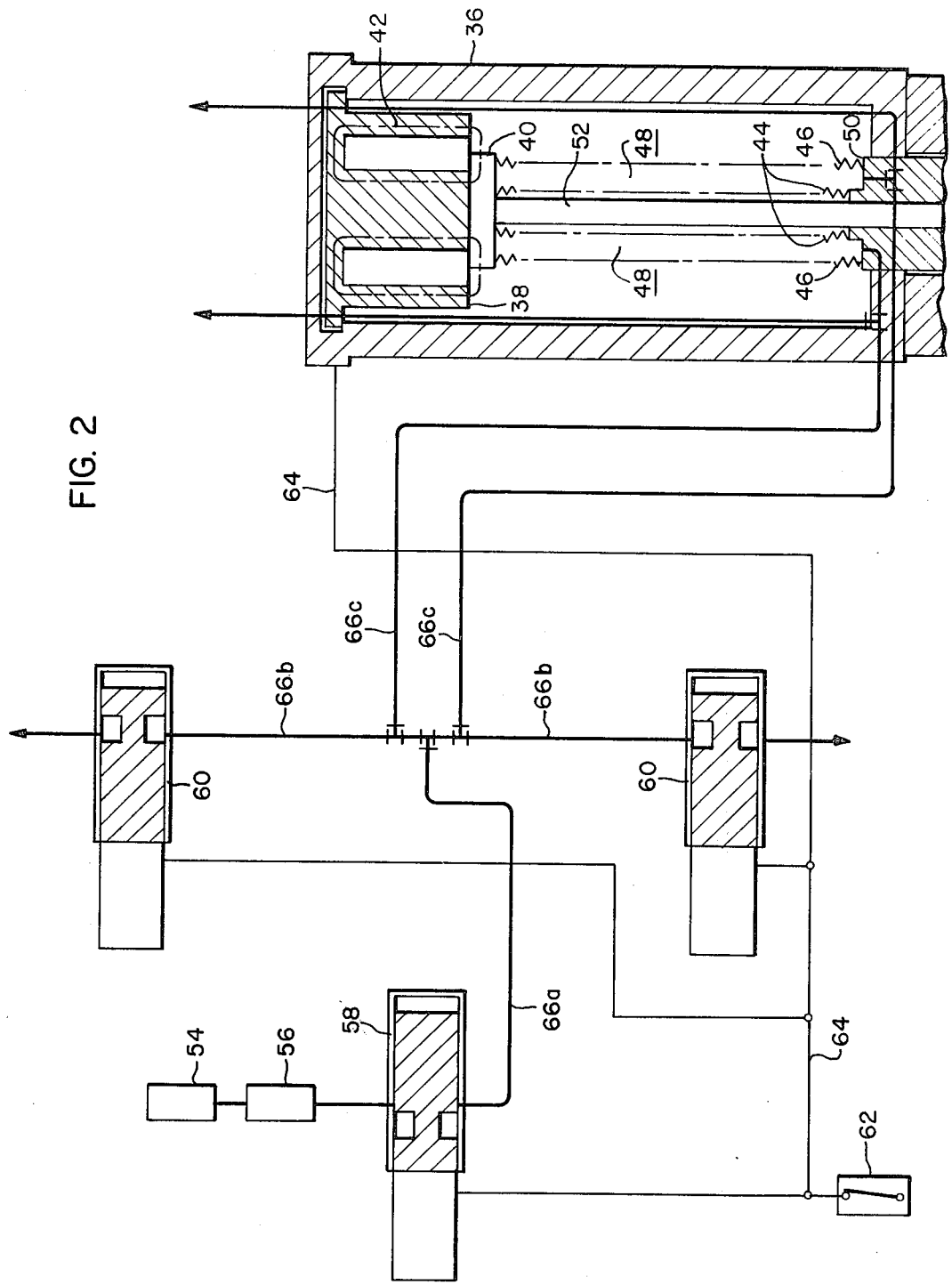
FIG. 2 is a simplified schematic of the pneumatic piping, electrical circuitry, and main apparatus in cross-section of one embodiment system disclosed.

FIG. 2 represents a simplified schematic of one embodiment system disclosed. Shown is one of the outer pressure tubes 36 enclosing and supporting an electromagnet assembly 38. At the bottom surface of the electromagnet assembly 38 is a magnetic armature 40, which, in its uppermost position, as shown, is held in place by a magnetic flux 42, (shown as a dashed line) which flux is generated when the electromagnet assembly 38 is energized. Welded to the magnetic armature 40 is a generally cylindrical inner bellows 44, and a generally cylindrical outer bellows 46, which together form a bellows annular region 48. The lower extremities of the inner bellows 44 and outer bellows 46 are welded to a generally circular cross section top shield 50 at about the elevation of the top of the closure head 14. The bellows annular region 48 is thus pressure tight. Permanently attached to the center of the magnetic armature 40 is a main shaft 52 which is ultimately connected to the neutron absorber assembly 34. Also shown is a pneumatic drive and vent portion of the system comprising a source of pressurized gas 54, a flow limiter 56, a cocking solenoid valve 58, a plurality of vent solenoid valves 60, a trip and test circuit switch 62, valving electrical connections 64, and pneumatic flow lines 66. The pressurized gas 54 may be any gas remaining in a gaseous state within a temperature range of between 0° F and 1200° F and a pressure range from atmospheric to about 250 psi. Typically used will be an inert gas, such as argon.

Operation of this embodiment system may now be described. During normal operation the neutron absorber assembly 34, suspended from the main shaft 52, is above the active core 20 region. To achieve this uppermost position, the cocking solenoid valve 58 is opened such that the pressurized gas 54 passes into line 66a. The cocking solenoid valve 58 is in a closed position during normal operation. At the same time the redundant vent solenoid valves 60, which are open during normal operation, are closed, thereby shutting off any gas flow in lines 66b and passing the pressurized gas 54 into lines 66c. The pressurized gas 54 thereby enters the bellows annular region 48 at a rate controlled by the flow limiter 56, thereby expanding the inner 44 and outer 46 bellows and raising, at a pedetermined rate, the magnetic armature 40, the main shaft 52, and hence the absorber assembly 34. The predetermined rate should be relatively slow to limit core transients as the absorber assembly 34 is withdrawn. After these components have been raised, the electromagnet assembly 38 is energized, forming the magnetic flux 42 which holds the magnetic armature 40 and attached components in the uppermost position. The cocking solenoid valve 58 is then placed in its normally closed position, and the redundant vent solenoid valves 60 are placed in their normally open position, allowing a portion of the pressurized gas 54 in the bellows annular region 48 to be vented. Upon an emergency or test signal, the electromagnet assembly 38 is deenergized and the magnetic armature 40, the main shaft 52, and the absorber assembly 34 drop, by the force of gravity, such that the absorber assembly 34 enters the active core 20 region and acts to shut down the fissioning process. As the vent path from the bellows annular region 48 is open to a lower pressure environment, any gases contained in the annular region 48 will not significantly resist the downward motion and collapsing of the inner 44 and outer 46 bellows. Other vent designs may be utilized, such as a vent path out of the assembly at about the elevation of the bottom of the bellows, with associated quick opening valving or other means on a shutdown or test signal. Further, the system is fail-safe in the sense that a loss of power to the electromagnet assembly 38 will cause the neutron absorber assembly 34 to drop into the core 20. Depicted by the switch 62, and thin lines representing electrical connections 64 is the trip and test circuit, shown in greater detail in FIG. 3.

FIG. 3 presents a simplified schematic of a second embodiment system disclosed. Here, the pressurized gas 54 is used not only to withdraw the absorber assembly 34 from the core 20, but also to maintain the absorber assembly 34 in the uppermost position. This embodiment also utilizes two-position redundant solenoid valves 68, here placed in a normally open configuration (shown) during normal operation. Similar to the embodiment depicted in FIG. 2, placing these valves 68 in the open position allows the pressurized gas 54 to enter the bellows annular region 48 and raise an arming disc 70 fixed to the bellows 44, 46 and the main shaft 52, thus raising the absorber assembly 34 to the uppermost position above the active core 20 region. Maintaining the redundant solenoid valves 68 in the open position maintains the absorber assembly 34 in the uppermost position. On the proper emergency signals, the redundant solenoid valves 68 will close, opening the pneumatic flow lines 66 to the vent paths 66b and allowing venting to a chosen lower pressure environment. The arming disc 70 and affixed components will then drop by gravitational forces, tending to shut down the reactor when the absorber assembly 34 enters the reactor core 20 region. The environment into which the pressurized gas 54 is vented may be controlled, and therefore may be a reactor containment atmosphere or a reactor plant gaseous waste handling system. Contamination of the pressurized gas 54 would only be a problem in the event of leakage through the bellows. FIG. 3 further depicts not only the redundancy of the pneumatic flow lines 66, but also the redundancy of the valving electrical connections 64. A typical nuclear facility will have a system causing actuation based upon two out of three logic. Typical parameters which may be monitored include coolant flow, coolant temperature, core flux, or a combination of these parameters, such as a flux-to-flow ratio.

Figure 4A:
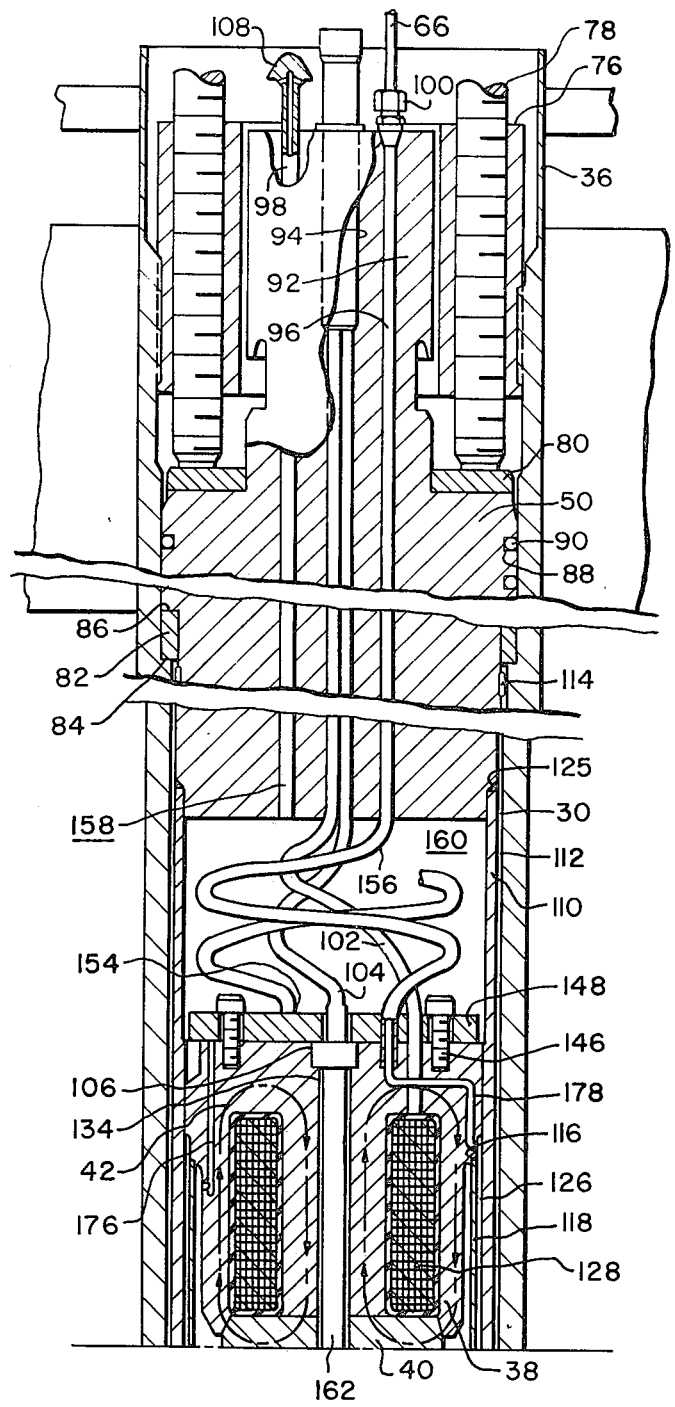
Figure 4C:
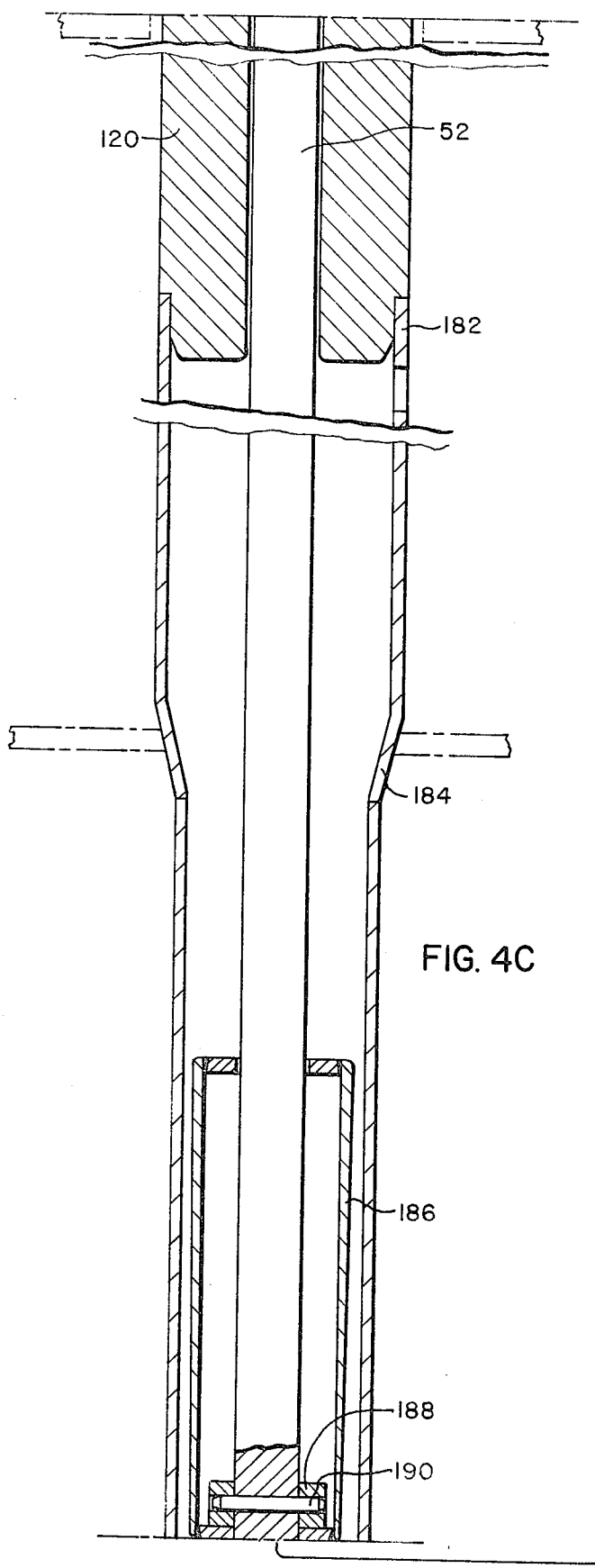
Figure 4D:
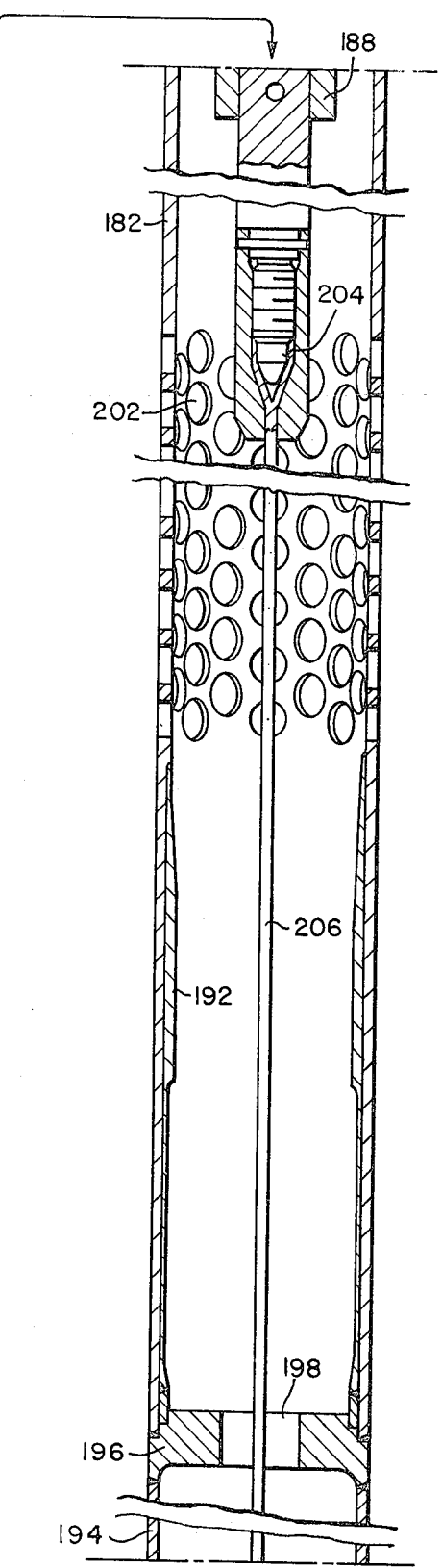
Figure 4E:
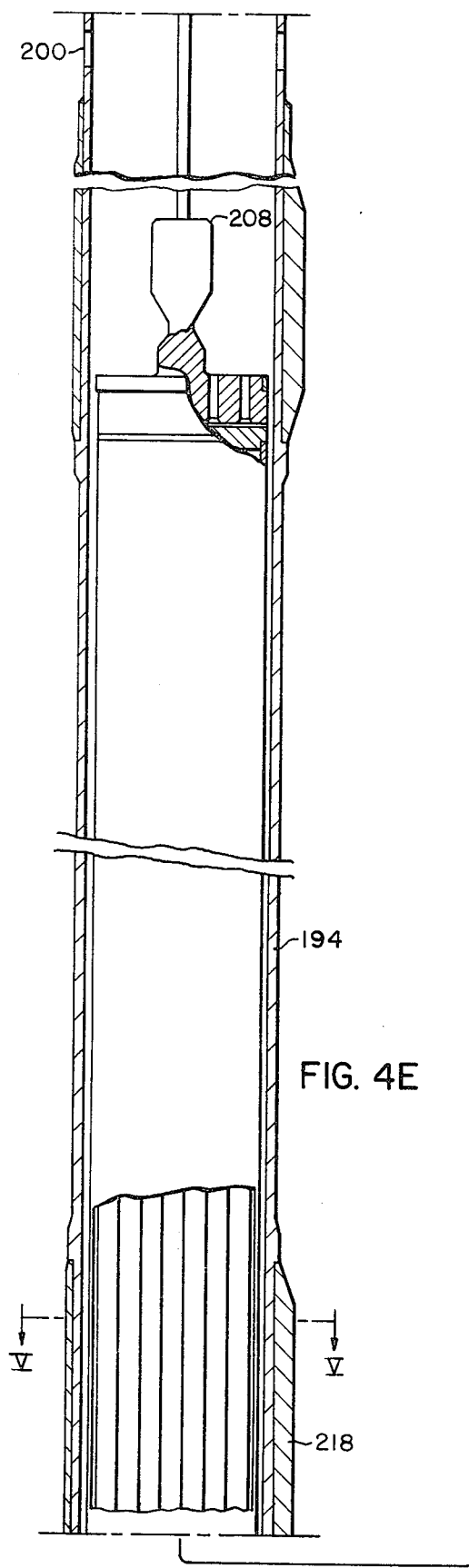
Figure 4F:
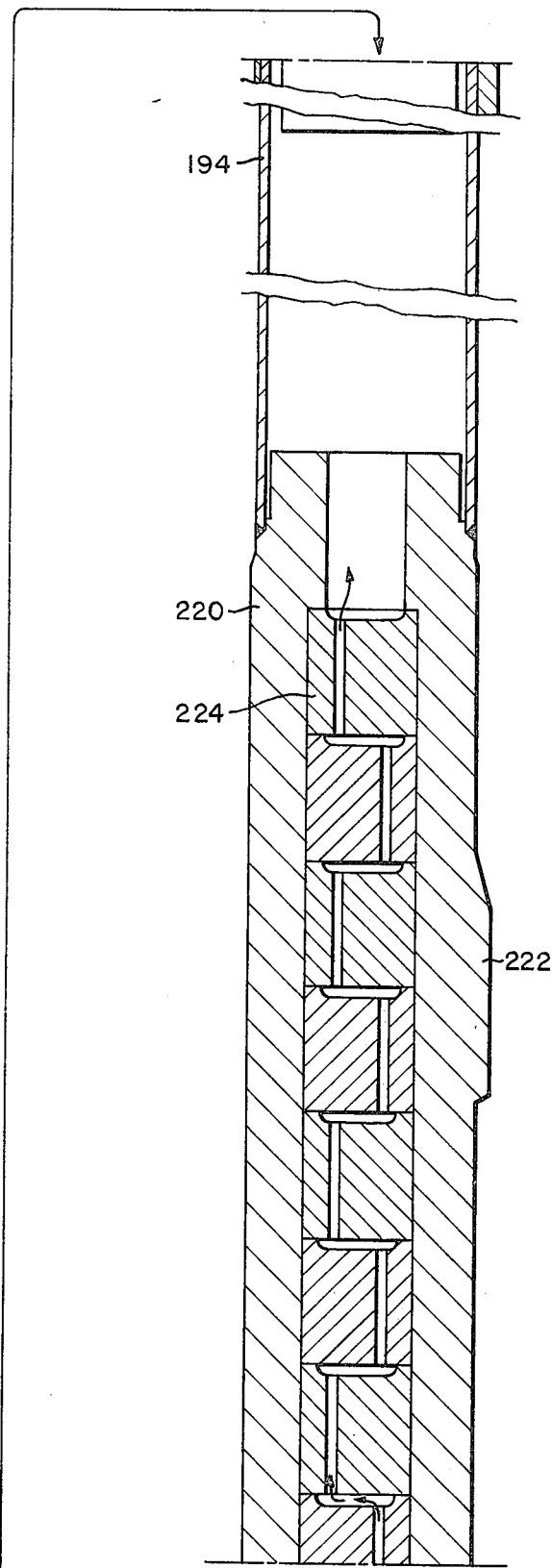
Figure 4G:
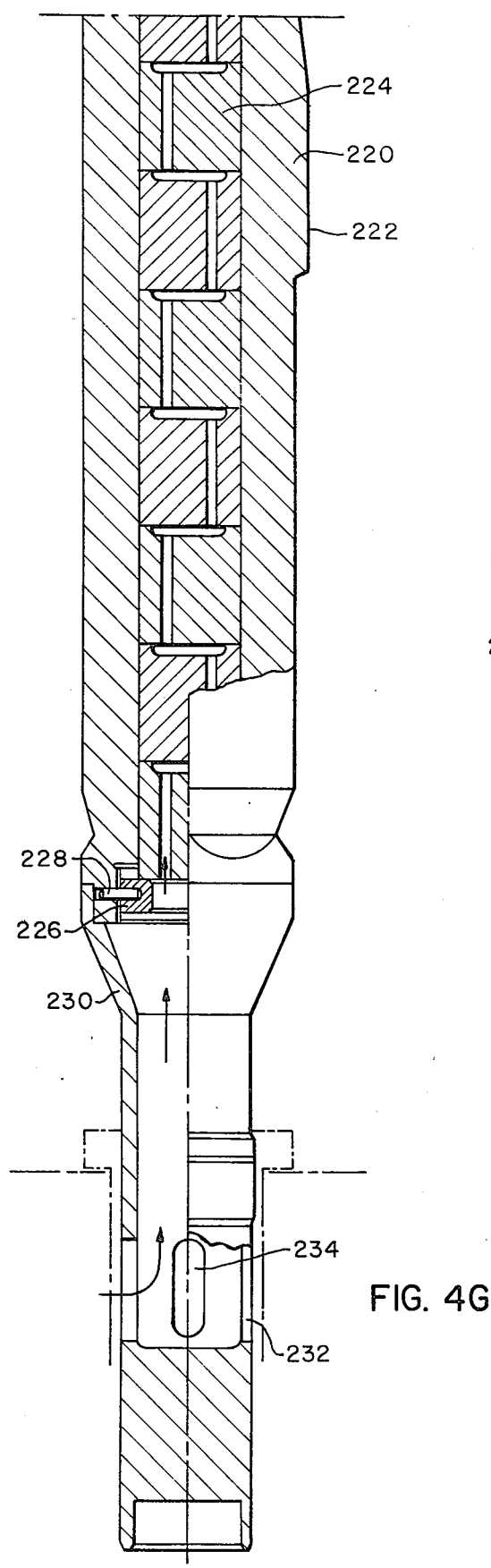

FIGS. 4A through 4G show the major apparatus of the diverse shutdown system utilizing a holding electromagnet assembly 38 in more detail. The Figures represent a continuation of the apparatus from top to bottom. Figures 4A and 4B show the top of the outer pressure tube 36 encasing the control rod drive mechanism assembly. The outer pressure tube 36 communicates with the inert cover gas 30 and is designed to withstand pressure in the range of 250 psi, and temperature in the range of 1200° F. The outer pressure tube 36 as shown forms a pressure tube (spoolpiece) nozzle 72, which mates with the closed test loop system (not shown) on the FFTF. In a typical commercial reactor, the outer pressure tube 36 (standpipe) continues downward such that the lower extremity of the pressure tube 36 would be permanently affixed to the upper surface of the closure head 14 (FIG. 1) by means such as circumferential welding or a pressure fit into the closure head 14 with tack welds. The outer pressure tube 36 narrows to a smaller outside diameter at several elevations from top to bottom, as the area required to enclose internal components is reduced. In the FFTF the pressure tube 36 is connected to the top of the test loop reactor head by bolts 74. The bolts 74 are utilized, as opposed to welding, to allow for repeated disassembly as necessary in a test facility. Immediately below the upper surface of the outer pressure tube 36 is a closure plug 76 and jacking bolts 78 assembly. In conjunction with a washer ring 80, the closure plug 76 and jacking bolts 78 tightly seat the top shield 50 to the outer pressure tube 36. The seat is formed at a circular upper metallic seal 82 which seats against a shoulder 84 of the outer pressure tube 36. The entire internals of the diverse control rod drive mechanism assembly is supported from this shoulder 84, and can be removed upward. The top shield 50 further serves as a barrier against radiation, and is typically comprised of a material such as austenitic stainless steel, or heavier materials such as depleted uranium, or tungsten. The top shield 50 comprises a plurality of cylindrical penetrations, discussed below, a generally cylindrical seating surface 86 for mating with the upper metallic seal 82, and generally cylindrical peripheral passages 88 for backup seals 90. Although the upper metallic seal 82 should serve as an adequate barrier against leakage of cover gas 30, the backup seals 90, typically elastomer O-ring type, further insure a leak tight barrier for the cover gas 30. The seals 90 are replaceable. The upper metallic seal 82 is also replaceable, although the replacement may not be necessary during reactor life. The upper portion of the top shield 50 narrows to a smaller diameter generally cylindrical head 92, through which penetrations pass and about which the jacking bolts are affixed.

Penetrating the open top of the outer pressure tube 36 and shown as the generally cylindrical passages through the top shield 50 are an electrical and instrument connector penetration 94, a pressurized gas supply penetration 96, and a vent penetration 98. A plurality of each type of penetration may be utilized. Having such penetrations at the top of the outer pressure tube 36 is the simplest mode of entry, although other means could be employed. For example, the vent 98 and gas supply 96 penetrations could enter the outer pressure tube 36 horizontally at lower elevations. The shown gas supply penetration 96 is aligned with the proper pneumatic flow line 66, and joined by a pressure tight conoseal type joint 100. Other pressure tight tubing adapter types may be used. The shown electrical and instrumentation penetration 94 forms a path through which electrical leads 102 to the electromagnet assembly 38, and the electrical leads 104 for electrical means of position indication pass. The leads are sealed by leak tight electrical connections 106. Aligned with the shown vent penetration 98 is a vent cap 108 which allows gases in the immediate environment about the outer pressure tube 36 to freely flow into, or out of, the apparatus, but which deflects particulate or other debris from entering the vent penetration 98.

Welded to the bottom of the top shield 50 is a generally cylindrical inner tube 110 which extends downward to an elevation just below the upper surface of the closure head 14. The inner tube 110 is of a non-magnetic material, such as austenitic stainless steel. The elevation of the closure head is depicted on FIG. 4B. Between the outer pressure tube 36 and the inner tube 110 is a cover gas annular passage 112 which terminates at the upper metallic seal 82. The annular passage 112 communicates directly with the interior of the reactor vessel 10. Although the inert cover gas 30 comes up to the elevation of the electromagnet assembly 38, alternate sealing means could be placed lower in the apparatus. In the FFTF, this sealing means could be placed just above the outer pressure tube nozzle 72, and in a commercial reactor could be placed just above the closure head 14. Sealing at a lower elevation would further ensure that any contaminants in the cover gas 30 remain within the reactor vessel. Shown just below the upper metallic seal 82 at the top of the cover gas annular passage 112 is a spring ring 114, which functions to capture the metallic seal 82 and remove it when the portion of the apparatus inside the outer pressure tube 36 is removed upward for repair, maintenance, observation, or absorber replacement. Within the inner tube 110, at some distance below the top shield 50, is the electromagnet assembly 38. The electromagnet assembly 38 is held in place by a weld 116 to an innermost wall 118; the innermost wall 118 is affixed to a head shield plug 120 by a weld 122; the head shield plug 120 is affixed to the inner tube 110 by a weld 124; the inner tube 110 is affixed to the top shield 50 which seats at the upper metallic seal 82, by a weld 125. Therefore, the electromagnet assembly 38 is held in place by a plurality of components and welds, ultimately removably suspended from the upper metallic seal 82 at the shoulder 84 of the outer pressure tube 36. The innermost wall 118 is a generally cylindrical tube extending from weld 116 to weld 122, with thin sections at the top portion in the region of the electromagnet assembly 38, and at the bottom portion in the region of the bottom of the outer bellows 46. The prime function of the innermost wall 118 is merely to create a pressurized gas annular region 126 by providing a surface between the inner tube 110 and the outer surface of the outer bellows 46. It also serves as a means for attachment of the plurality of components to the top shield 50, as described above.

Figure 6:
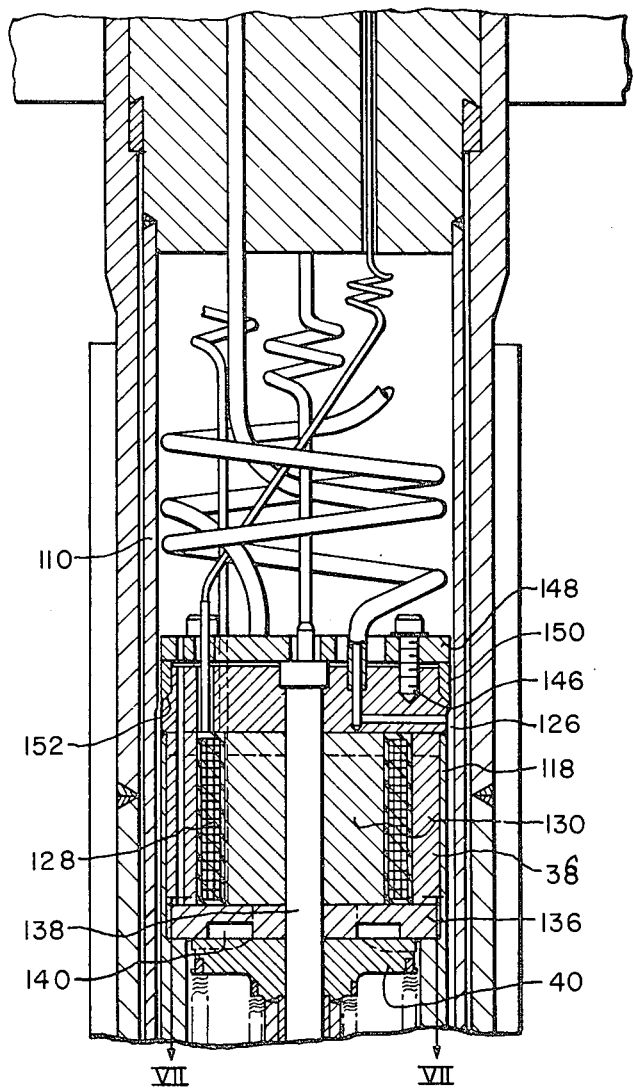
FIG. 6 is a view, in section, showing additional detail of the components shown in FIG. 4A.
Figure 7:
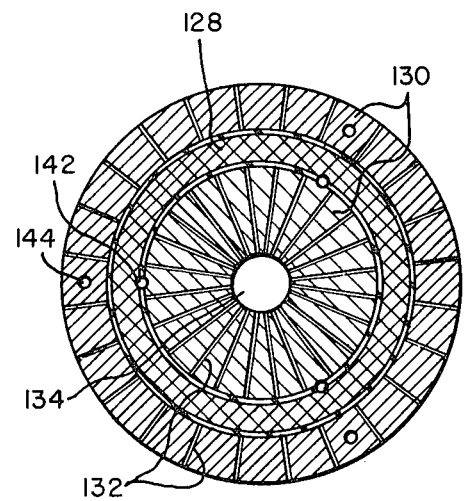
FIG. 7 is a view, in section, taken at VII—VII of FIG. 6.

Additional details of the electromagnet assembly 38 are shown in FIGS. 6 and 7. The electromagnet assembly 38 comprises three coils 128 concentrically held within an electromagnet pole assembly 130. The pole assembly 130 is of a ferrous material, such as 47% Ni, 53% Fe ferronickel annealed, and is generally two concentric thick-walled cylinders containing vertical apertures and a plurality of radial slots 132. The inner cylinder contains a cylindrical inner shaft aperture 134. The strength of the magnetic flux 42 generated by the three coils 128 is such that any two of the three will hold the magnetic armature 40 and attached components in the uppermost position, and any one will not. Held in place against the bottom of the pole assembly is a magnetic shunt 136, which is generally a cylindrical disc containing a shunt inner shaft apperture 138 concentric with aperture 134, and a circular cutout 140 at its bottom face. The magnetic shunt 136 and coils 128 are such that the lower portion of the flux path 42 generated is two generally parallel levels, although the holding strength of each of the three coils 128 is generally the same. The radial slots 132 in both cylinders of the electromagnet pole assembly 130 are of varying depth from the top and bottom faces of the cylinders. The slots enhance the drop time by minimizing any rotation of the current/flux on an emergency or test signal, thereby reducing the magnetic decay time. A similar function is performed by the cylindrical cutout 140 in the magnetic shunt 136. A plurality of cooling inlet holes 142 and cooling outlet 144 holes penetrate the electromagnet pole assembly, such that a cooling gas can be passed down the inlet hole 142, horizontally along the bottom of the coils 128, and up the outlet hole 144. Typically an inert gas, such as argon, will be used for cooling the coils 128. The electromagnet assembly as described is of a type as described in "The Design and Testing of a Coincidence Electromagnet for Reactor Safety Systems" (thesis), William Douglas Brown, Oak Ridge National Laboratory, ORNL-TM-2572. It should be noted that the entire electromagnet assembly 38 could be placed lower in the apparatus, significantly shortening the lower components. The assembly 38 could be placed below the closure head 14, although high temperature electrical insulation would then be required to withstand temperatures in the range of 1100° F.

Affixed by threaded means 146 at the top of the electromagnet assembly 38 is an electromagnet mounting 148. The mounting 148 is generally a circular disc with a plurality of circular holes, further comprising a protruding outer hollow cylindrical bottom 150. The cylindrical bottom 150 seats against a lower metallic seal 152 (FIG. 6) which fits between the bottom of the mounting 148 and the upper portion of the electromagnet assembly 38. The electromagnet mounting 148 also includes fastening at 154 (FIG. 4A) which fasten and seal a plurality of the penetration tubes 156, aligned with the circular holes in the mounting 148, to the electromagnet assembly 38. The lower metallic seal 152 seals against the inner tube 110 and prevents leakage of pressurized gas 54 out of the pressurized gas annular region 126, the annular region 126 being formed by the inner surface of the inner tube 110 and the exterior surface of the innermost wall 118.

Referring to FIG. 4A, the penetration tubes 156 act as conduits between the penetrations 94, 96 and the electromagnet mounting 148. One of the tubes 156 carries electrical leads to the electromagnet coils 128, and also carries leads for reed switch electrical position indication. Two other tubes 156 function as redundant conduits for the pressurized gas fed into, and vented out of, the bellows annular region 48. The vent penetration 98 is not connected to a penetration tube 156, allowing the gas 158 in the immediate environment about the outer pressure tube 36 (such as air), to fill the space 160 between the bottom surface of the top shield 50 and the upper surface of the electromagnet mounting 148. Centrally located within the electromagnet assembly 38, and extending downward a length at least equivalent to the distance the magnetic armature 40 and affixed components will drop, is an inner shaft 162. The inner shaft 162 is clamped at its upper extremity to the electromagnet mounting. About the periphery of the inner shaft 162 are reed switches 164 (FIG. 4B), which are actuated by a permanent magnet 166 to provide position indication. The permanent magnet 166 is permanently welded to the upper portion of a main shaft 52.

At the bottom surface of the electromagnet assembly 38 is the mating movable magnetic armature 40, shown in the cocked or uppermost position. The magnetic armature 40 is a generally circular disc with a centrally located aperture 168, the disc narrowing through two changes in cross section to a hollow cylindrical tube 170. The tip of the tube 170 is welded to the main shaft 52. The contact between the assembly 38 and magnetic armature 40 is finely controlled, such that no gaps exist and the magnetic flux 42 is continuous when the coils 128 are energized. To lessen the strength of the magnetic flux 42, gaps can be allowed to enhance the drop time. The magnetic armature 40 is of a high magnetic permeability material, and is permanently welded to the main shaft 52. The main shaft 52 surrounds the inner shaft 162, and extends below the bottom of the inner shaft 162 (FIG. 8C). Encased within, and welded to the upper portion of the main shaft 52 is the permanent magnet 166, the sole function of which is to actuate the reed switches 164. The main shaft 52 is a generally hollow cylindrical tube throughout the length of the inner shaft 162, and a solid cylindrical tube below that point, extending to the connection (discussed below) of the lower portions of the main apparatus.

Welded to the magnetic armature 40 are the upper extremities of the inner 44 and outer 46 bellows. A cover gas inner annular space 172 is formed between the inner bellows 44 and the outer surface of the main shaft 52. There is direct communication between annular space 172 and the interior of the reactor pressure vessel 10. Communicating with the gas 158 in the immediate environment about the outer pressure tubes 36 is an environment gas annular region 174 formed between the outer bellows 46 and the innermost wall 118. This region communicates upward through the electromagnet assembly by a passage 176 to the region above the electromagnet mounting 148. Both of the annular regions 172 and 174 are of a relatively large cross-section. The relatively large clearances provided by these annular regions helps to eliminate any possible binding during the fall of the components. The annular regions, however, do help to guide the bellows in the event of extensive horizontal displacement.

To summarize the flow paths and gases contained within the various annular regions of this embodiment: (i) reactor inert cover gas 30 communicates between the interior of the reactor pressure vessel 10 and (a) annular region 112 and (b) annular region 172. The cover gas 30 within these annular regions will be relatively stagnant. (ii) gas 158 such as air communicates between the environment external to the outer pressure tube 36 and annular region 174, to a lower elevation at the bottom of the outer bellows 46. During a drop this gas 158 will fill the area vacated by the magnetic armature 40, the otherwise expanded bellows, and the upper portion of the main shaft 52. (iii) pressurized gas 54 enters the apparatus from the top, passes through the pressurized gas supply penetration 96, through the penetration tube 156, through the electromagnet assembly by a pressurized gas passage 178, continuing downward through annular region 126, and into the bottom of the bellows annular region 48 through a lower pressurized gas passage 180. On deenergizing of the coils 128, the bellows annular region 48 collapses, due to gravity and the weight of the attached components, forcing the pressurized gas to reverse the described flow path.

The inner 44 and outer 46 bellows are permanently fixed at the bottom, by means such as welding, to the head shield plug 120 (FIGS. 4B and 4C), at about the level of the top of the closure head 14. The head shield plug 120 is generally a thick walled hollow cylinder, which forms the outer surface of the apparatus assembly as it passes through the closure head 14 area. The head shield plug 120 acts as a barrier to neutrons and other radioactive emissions, such as gamma rays. As mentioned above, the inner tube 110 is welded to the head shield plug 120 by weld 124 at about the same elevation as the bottom of the bellows. The head shield plug 120 surrounds the main shaft 52, and allows adequate clearance to eliminate binding when the magnetic armature and attached components drop. At its lower surface, the head shield plug 120 is permanently affixed to an upper guide tube 182.

The upper guide tube 182 is generally a thin walled hollow cylinder with a transition 184 to a smaller outer diameter at about the upper level of liquid coolant 28 in a typical reactor (FIG. 1). The guide tube 182 contains a floating buffer piston 186. The generally cylindrical buffer piston 186 is affixed to the main shaft 52 by a cylindrical collar 188 and pin 190 arrangement. Other attaching means, such as threads, could be used. The buffer piston 186 is tapered toward the bottom so as to mate with a compatibly shaped buffer cylinder 192 (FIG. 4D), contained within the upper guide tube 182, upon the fall of the piston. The buffer cylinder 192 is generally a thin walled hollow cylinder, with an inward tapering internal portion. Slightly above the buffer piston 186 in its uppermost position is the transition from the reactor coolant fluid level 28 (FIG. 1) to the reactor cover gas 30. During the major portion of the fall, the buffer piston 186 is above the buffer cylinder 192. Then, the buffer piston 186 enters the buffer cylinder 192, and the frictional force of the coolant fluid between the piston 186 and cylinder 192 decelerates the fall. The fall velocity is reduced to a negligible value when the bottom of the buffer piston 186 contacts the lower portions of the buffer cylinder 192. In the FFTF apparatus, there are 28 inches of fall before the buffer piston 186 enters the buffer cylinder 192. The total fall is 37 inches and the active core length 36 inches. The buffer cylinder 192 is of a material to minimize gaulling, such as Inconel 718, and transition pieces of stainless steel may be used to facilitate welding the cylinder in place. Dependent upon the configuration of the lower core support structure of a commercial reactor, the buffer cylinder/piston arrangement could be placed below the core by extending an affixed shaft through the absorber assembly 34. Other damping means, such as springs, could also be used.

The bottom of the upper guide tube 182, below the buffer cylinder 192, is permanently affixed by means such as welding to a structural tube 194, and a primary stop 196. The primary stop 196 stops the fall of the cylinder 192, the absorber assembly 34, and attached components, when the cylindrical collar 188 contacts the stop 196. The stop 196 includes a circular hole 198 to allow passage of the lower portion of the main shaft 52, and reactor coolant fluid flow when the apparatus is in the uppermost or cocked position. When the apparatus is in the lower position, the flow upward is blocked and flow exits the apparatus at a lower position. The bottom of the buffer cylinder 192 is also welded into the top of the stop 196. The structural tube 194 is generally a thin walled hollow cylinder with a plurality of flow holes 200 (FIG. 4E) for discharge of coolant into the outlet plenum 26. The upper guide tube 182 comprises openings 202 (FIG. 4D) in the tube wall through which reactor coolant is primarily discharged during a fall. Coolant fluid flowing through the apparatus during normal operation is primarily discharged through the flow holes 200 in the wall of the structural tube 194.

Figure 5:
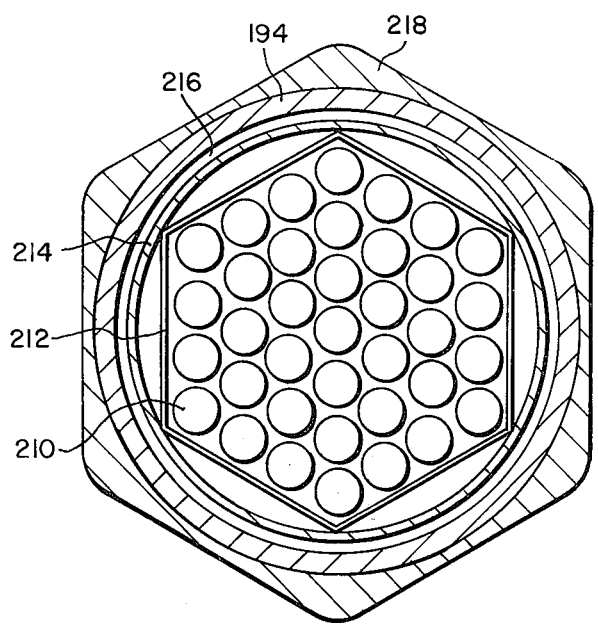
FIG. 5 is a section taken at V—V of FIG. 4E.

The bottom of the main shaft 52 comprises means 204 to affix a relatively small diameter flexible shaft 206. The flexible shaft 206 is permanently affixed to a coupling head 208 of the absorber assembly 34. Although a rigid shaft could be utilized, a flexible shaft minimizes twisting of the bellows 44, 46 and associated wear, which could occur as a result of horizontally induced forces in the core area. The absorber assembly 34 comprises a plurality of absorber rods 210 (FIG. 5), contained within an hexagonal inner duct 212, which inner duct 212 is contained within a generally cylindrical outer duct 214. The absorber material typically comprises boron carbide ($B_4C$), although other neutron absorbing materials may be used, such as those comprising hafnium, tantalum, or lithium. An absorber annular region 216 is formed between the outer duct 214 and the inner surface of the structural tube 194. During a fall the outer duct 214 and the components contained therein fall. The annular absorber region 216 provides adequate clearance to eliminate binding during the fall. A plurality of hexagonal wear pads 218 are permanently affixed to the exterior of the structural tube 194, and butt against other upper internals 24 components to maintain alignment and provide lateral support. The pads are of a minimum gaulling material, such as Inconel 718. As Inconel is relatively difficult to weld, and any welds must be heat treated, the pads 218 may be affixed to the structural tube 194 by retaining rings of a material such as austenitic stainless steel, which has better welding properties. The wear pads are necessary as there is axial displacement among the apparatus components which are top supported, and adjacent core components typically supported from the bottom.

The bottom of the structural tube 194 is welded to a bottom shield 220 (FIG. 4F), the lower portion of which comprises an hexagonal section 222. The bottom shield 220 circumferentially encloses a plurality of orifice plates 224, through which reactor coolant passes. Passage through the path of orifice plates 224 achieves the necessary pressure drop, and adjusts the rate of coolant flow to the absorber assembly 34. A small amount of cooling flow is required to the control rod assembly as contrasted with other core components. The orifice plates 224 are held in place by a bottom ring 226 (FIG. 4G) which ring 226 is held in place by a dowel pin 228. The pin 228 and ring 226 are located at about the elevation where the bottom shield 220 is affixed to a flow transition piece 230. The flow transition piece 230 is shaped so as to mate with a receptable 232 of the lower core structure components. Coolant fluid enters the flow transition piece 230 radially through an opening 234.

Figure 8A:
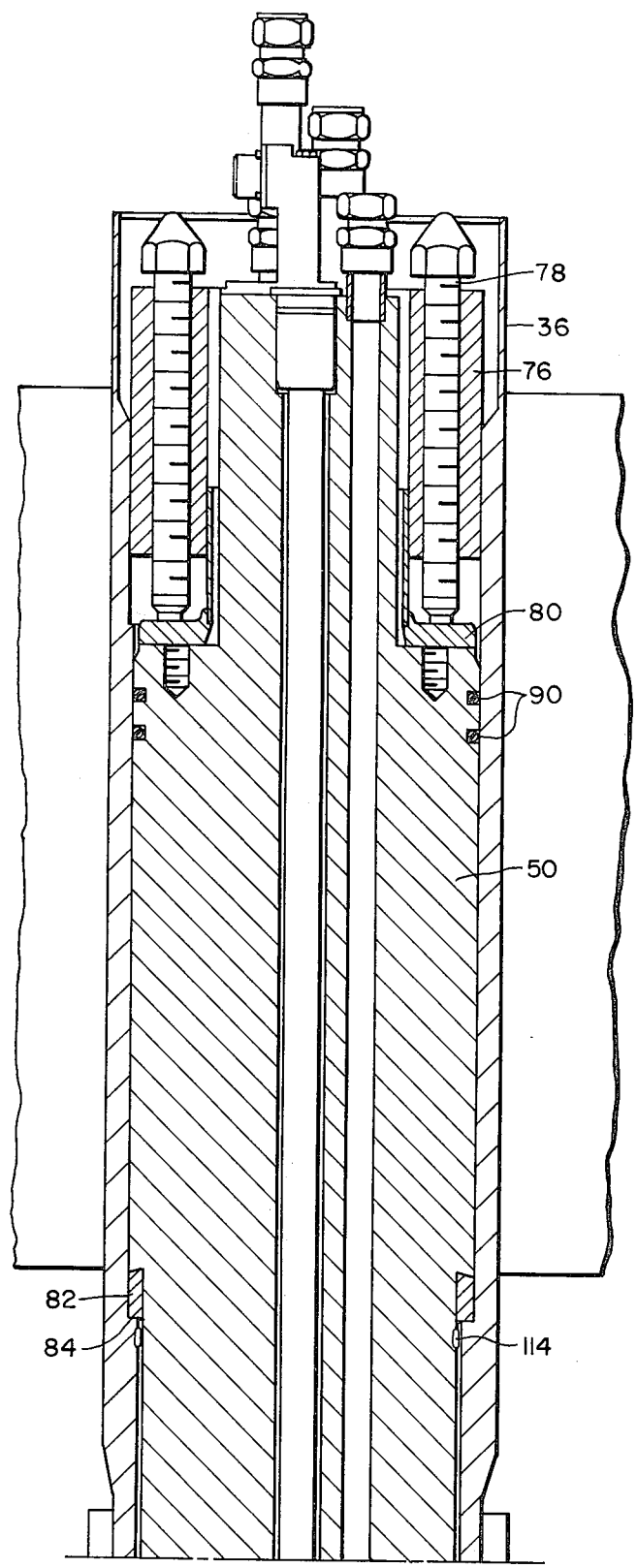
FIGS. 8A, 8B and 8C is a view, in cross-section, from top toward the bottom, of the main apparatus in a second embodiment.
Figure 8B:
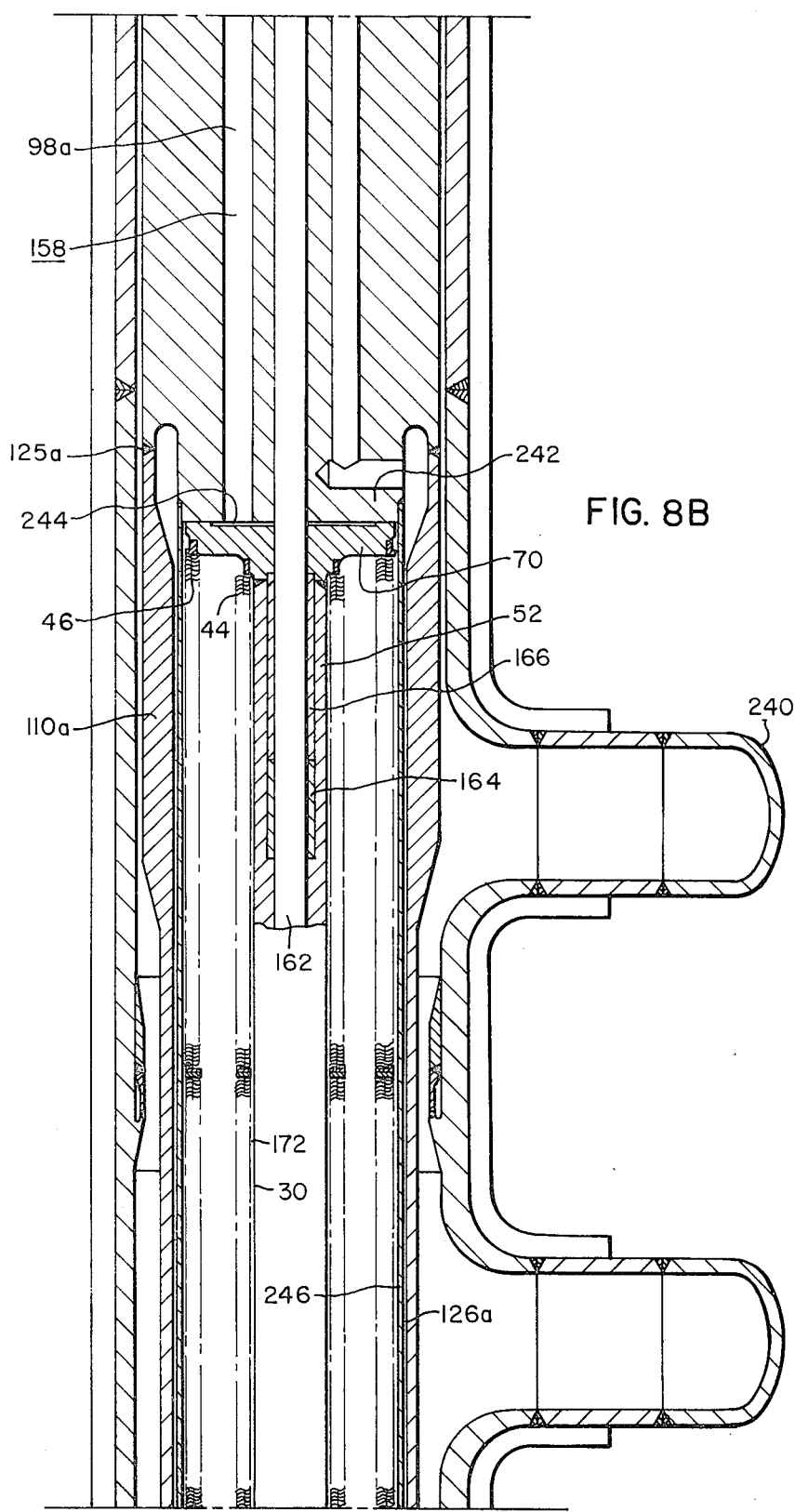
Figure 8C:
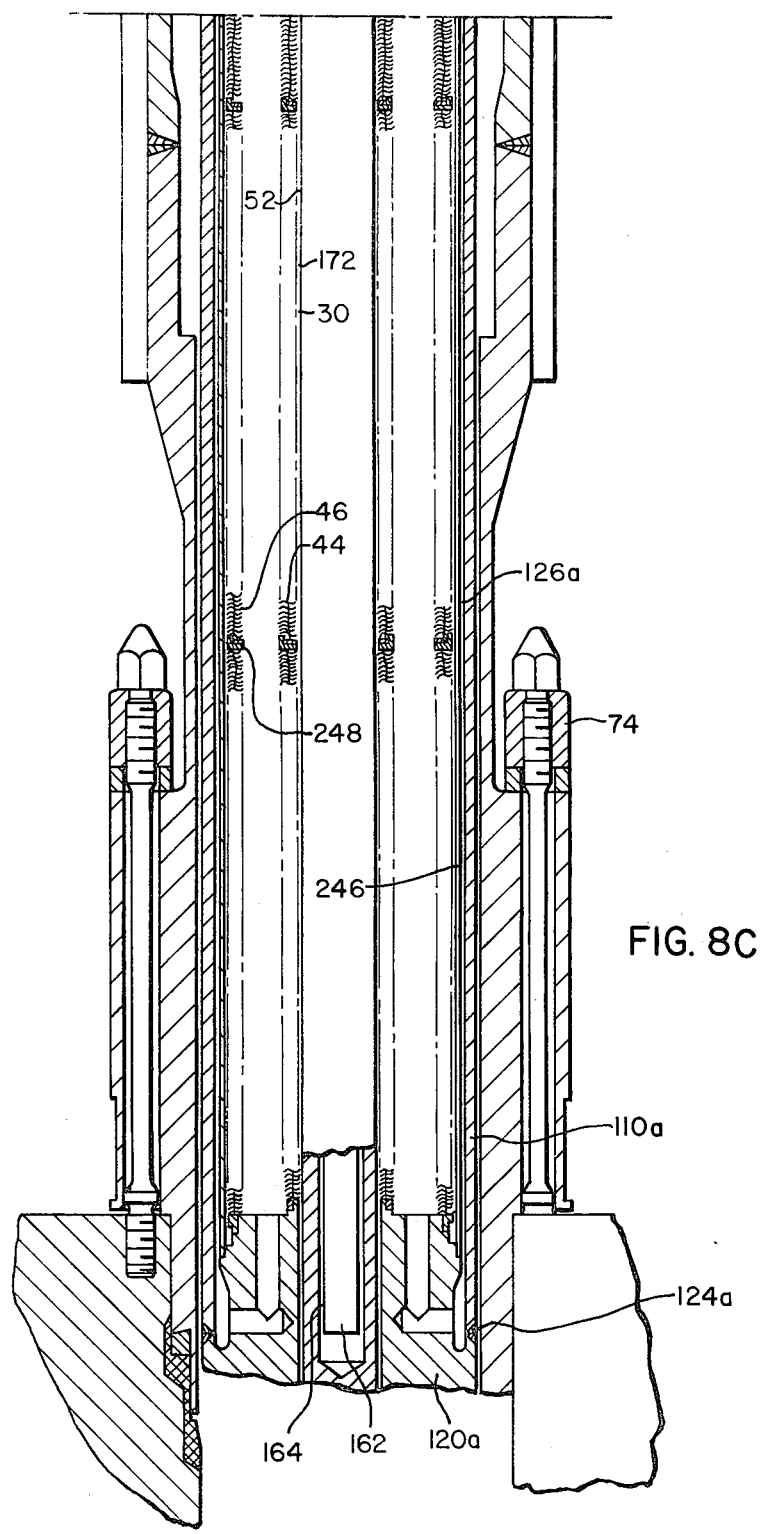

FIGS. 8A, 8B and 8C illustrate the main apparatus described generally above with reference to FIG. 3, showing the second main embodiment. That apparatus utilizes the pressurized gas 54 not only to raise the absorber assembly 34 to a position above the core 20, but also to hold the arming disc 70 and hence the absorber assembly 34 in an uppermost position. This apparatus is basically similar to the apparatus illustrated in FIGS. 4A through 4G with differences as described below. Additional illustrative detail is provided for some of the components discussed above in FIGS. 8A, 8B and 8C.

The outer pressure tube 36 may be identical to that described earlier, although shown attached are spool piece branch arm nozzles 240 (shown capped) as utilized on the FFTF. The closure plug 76, jacking bolts 78, and washer ring 80, may also be identical. However, the top shield 50 to which the bolts 78 are attached, is elongated as compared to the magnetic armature apparatus. The elongated portion of the top shield 50 replaces the internal volume of the apparatus vacated by elimination of the electromagnet assembly 38, the electromagnet mounting 148, the penetration tubes 156, and the means fastening these components together.

The upper sealing means, comprising the upper metallic seal 82 at the shoulder 84 of the outer pressure tube 36, the associated spring ring 114, and the backup seals 90, may also be identical.

The major differences between the two main embodiments disclosed herein are most evident in the area of the arming disc 70. As the arming disc 70 is not held in position by a magnetic flux, a fine fit between the arming disc 70 and the mating surface in the uppermost position, here being the bottom surface of the top shield 50, or up stop 242, is not required. The arming disc 70 maintains its generally cylindrical shape, and has a recessed generally cylindrical output 244. The arming disc 70 is permanently affixed to the upper extremities of the inner 44 and outer 46 bellows, and is also permanently affixed to the main shaft 52. The main shaft may be identical to that discussed previously, and surrounds the permanent magnet 166 which similarly actuates reed switches 164 located on the inner shaft 162.

The basic design suspending the internal components of the apparatus from the shoulder 84 of the outer pressure tube 36 is maintained, although the actual attachment of the components is somewhat changed. Here, the attachment is simplified by elimination of the electromagnet assembly. The top shield 50 is affixed to the inner tube 110a by a circumferential weld 125a. At the bottom extremity of the inner tube 110a, a circumferential weld 124a affixes the inner tube 110a to the head shield plug 120a, similar to the prior discussed apparatus, at about the elevation of the lower extremity of the inner 44 and outer 46 bellows. An additional thin cylindrically shaped tube 246 is welded at the top to the up stop 242 and at the bottom to the head shield plug 120a so as to form the inner surface of the pressurized gas annular region 126a and the outer surface of that which is the environment gas annular region 174 in the prior discussed apparatus. In this second main embodiment, gas 158 from the immediate environment about the outer pressure tube 36 communicates with the interior of the apparatus through a vent cap (not shown) similar to that described earlier. Here, however, the communication is through a vent penetration 98a, which opens into the cylindrical cutout 244 in the arming disc 70. When the arming disc 70 drops, the environment gas 158 is exposed to the annular region between the thin cylindrical tube 246 and the outer surface of the inner shaft 162. Reactor cover gas 30, in this embodiment, enters the cover gas inner annular space 172 formed between the inner bellows 44 and the main shaft 52 from inside the reactor pressure vessel 10.

Below the elevation shown on FIG. 8C, the two main apparatus are essentially the same. The bolting 74 attachment for the FFTF is also the same. Additional detail of the internal components is shown in FIGS. 8A to 8C. Shown in FIG. 8C is the lower extremity of the inner shaft 162, and hence the lower extreme of the reed switches 164 mounted on the inner shaft 162 for position indication. Additional detail of the inner 44 and outer 46 bellows is shown.

The inner 44 and outer 46 bellows are of the metallic nested type, which are readily available in the commercial marketplace. A typical material of such bellows is Inconel 718. Although the bellows could be one piece throughout their length, generally they comprise a series of lengths joined by welded tips 248. The bellows must withstand the pressure exerted by the pressurized gas, normally in the range of 50 psi.

As shown with elimination of the electromagnet assembly, a number of top connections and penetration tubes are eliminated. The electrical penetration for position indication is maintained, although leads for the electromagnet are eliminated.

As discussed, most of the components of the two main embodiments are similar, differences arising mainly in the area of the electromagnet assembly. The inventions provide a diverse shutdown system which fulfills the reliability, diversity, and redundancy requirements of a nuclear facility.

What we claim is:

1. A shutdown system for a nuclear reactor having a pressure vessel with an upper head, a support plate within said vessel, a vertically oriented core supported atop said support plate and means for circulating a coolant through said support plate and core, said system comprising:
   a. a vertical pressure tube sealingly affixed to said head having an internal circumferential shoulder;
   b. an upper radiation shield disposed within said tube having a circular seating surface;
   c. means for removably supporting and sealing said upper shield within said pressure tube including a circumferential metallic seal matingly disposed between said support ledge and said seating surface, a circumferential spring ring disposed about said upper shield below said seal sized to contact the bottom of said seal upon vertical lifting of said upper shield, and a closure plug and jacking bolts assembly disposed above said upper shield and positionable to tightly seat said support ledge and seating surface against said seal;
   d. a generally cylindrical lower radiation shield sized to removably fit within said outer pressure tube and having a vertical opening therethrough, said lower shield disposed at the elevation of said head;
   e. an inner tube arranged concentrically within said pressure tube sealingly affixed at its upper portion to said upper shield, and at its lower portion to said lower shield;
   f. an electromagnet assembly sealingly affixed within said inner tube below and spaced from said upper shield and above said lower shield having a vertical aperture therethrough;
   g. an inner shaft sealingly affixed to said electromagnet assembly extending from the upper end of said electromagnet downward through said aperture;
   h. an inner tubular wall sealingly affixed to said electromagnet assembly and said lower shield forming a pressurized gas annulus between said inner tube and said inner tubular wall;
   i. a magnetically responsive armature sized to matingly abut the bottom of said electromagnet within the magnetic flux formed by said electromagnet, said armature having a vertical opening through which said inner shaft passes;
   j. a main shaft affixed to said armature surrounding said inner shaft throughout the length of said inner shaft, and said main shaft extending through said lower shield opening;
   k. a set of metallic bellows disposed concentrically about said main shaft and within said inner tubular wall sealingly affixed at the top to said armature and at the bottom to said lower shield so as to form a pressure bearing bellows annulus between said set and an atmosphere annulus between the outer bellows of said set and said inner tubular wall;
   l. a flexible shaft affixed to the bottom of said main shaft;
   m. a neutron absorbing control rod coupled to said flexible shaft;
   n. tubular means for conducting said coolant affixed at the top to said lower shield and terminating at the bottom in an inlet nozzle receiving said circulating coolant from below said support plate;
   o. means for selectively conducting and venting a pressurized gas between the top of said pressure tube and the bottom of said bellows annulus including, in series, a conduit passing through said upper shield and affixed to said electromagnet assembly, an upper passageway through said electromagnet assembly to said pressurized gas annulus, and a lower passageway through said lower shield from said last-named annulus to said bellows annulus;
   p. means for allowing fluid communication between the atmosphere surrounding the top of said pressure tube and said atmosphere annulus including, in series, an opening extending vertically through said upper shield and a magnet passageway through said magnet to said atmosphere annulus; and
   q. means for conducting electrical energy from atop said pressure tube to said electromagnet assembly including a conduit for containing electrical leads which passes vertically through said top shield and to said electromagnet assembly.

2. A shutdown system for a nuclear reactor having a pressure vessel with an upper head, a support plate within said vessel, a vertically oriented core supported atop said support plate and means for circulating a coolant through said support plate and core, said system comprising:
   a. a vertical pressure tube sealingly affixed to said head having an internal circumferential shoulder;
   b. an upper radiation shield disposed within said tube having a circular seating surface;
   c. means for removably supporting and sealing said upper shield within said pressure tube including a circumferential metallic seal matingly disposed between said support ledge and said seating surface, a circumferential spring ring disposed about said upper shield below said seal sized to contact the bottom of said seal upon vertical lifting of said upper shield, and a closure plug and jacking bolts assembly disposed above said upper shield and positioned to tightly seat said support ledge and seating surface against said seal;
   d. a generally cylindrical lower radiation shield sized to removably fit within said outer pressure tube and having a vertical opening therethrough, said lower shield disposed at the elevation of said head;
   e. an inner tube arranged concentrically within said pressure tube sealingly affixed at its upper portion to said upper shield, and at its lower portion to said lower shield;

f. an inner shaft sealingly affixed to said upper shield extending from the upper end of said upper shield downward through said opening;

g. an innermost tubular wall sealingly affixed to said upper shield and said lower shield forming a pressurized gas annulus between said inner tube and said inner tubular wall;

h. an armature sized to matingly abut the bottom of said upper shield, said armature having a vertical opening through which said inner shaft passes;

i. a main shaft affixed to said armature surrounding said inner shaft throughout the length of said inner shaft said main shaft extending through said lower shield;

j. a set of metallic bellows disposed concentrically about said main shaft and within said inner tubular wall sealingly affixed at the top to said armature and at the bottom to said lower shield so as to form a pressure bearing bellows annulus between said set and an atmosphere annulus between the outer bellows of said set and said inner tubular wall;

k. a flexible shaft affixed to the bottom of said main shaft;

l. a neutron absorbing control rod coupled to said flexible shaft;

m. tubular means for conducting said coolant affixed at the top to said lower shield and terminating at the bottom in an inlet nozzle receiving said circulating coolant from below said support plate;

n. means for selectively conducting and venting a pressurized gas between the top of said pressure tube and the bottom of said bellows annulus including, in series, a passageway through said upper shield to said pressurized gas annulus, and a lower passageway through said lower shield from said last-named annulus to said bellows annulus; and o. means for allowing fluid communication between the atmosphere surrounding the top of said pressure tube and said atmosphere annulus including an opening extending vertically through said upper shield, to said atmosphere annulus.

* * * * *